US009689893B2

(12) United States Patent
Ando

(10) Patent No.: US 9,689,893 B2
(45) Date of Patent: Jun. 27, 2017

(54) SCANNING PROBE MICROSCOPE

(71) Applicant: HITACHI HIGH-TECH SCIENCE CORPORATION, Tokyo (JP)

(72) Inventor: Kazunori Ando, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 15/168,985

(22) Filed: May 31, 2016

(65) Prior Publication Data

US 2016/0356810 A1 Dec. 8, 2016

(30) Foreign Application Priority Data

Jun. 2, 2015 (JP) ................................. 2015-111872

(51) Int. Cl.
  *G01Q 30/12* (2010.01)
  *G01Q 30/16* (2010.01)
  *G01Q 30/20* (2010.01)

(52) U.S. Cl.
  CPC ............. *G01Q 30/16* (2013.01); *G01Q 30/20* (2013.01); *G01Q 30/12* (2013.01)

(58) Field of Classification Search
  CPC ......... G01Q 30/12; G01Q 30/16; G01Q 30/20
  See application file for complete search history.

(56) References Cited

U.S. PATENT DOCUMENTS

| 6,085,581 A * | 7/2000 | Jones ..................... B82Y 35/00 73/1.79 |
| 6,093,930 A * | 7/2000 | Boyette, Jr. ............ B82Y 35/00 250/442.11 |
| 6,127,681 A * | 10/2000 | Sato ....................... B82Y 35/00 250/307 |
| 8,371,182 B1 * | 2/2013 | Israelachvili ............ G01N 3/04 356/244 |
| 2014/0092717 A1 * | 4/2014 | Tokutomi ............... G11B 5/455 369/53.38 |

FOREIGN PATENT DOCUMENTS

| JP | 2612395 | 5/1997 |
| JP | 2001-153460 | 6/2001 |

* cited by examiner

*Primary Examiner* — Nicole Ippolito
*Assistant Examiner* — Sean Luck
(74) *Attorney, Agent, or Firm* — Hamre, Schumann, Mueller & Larson, P.C.

(57) ABSTRACT

Disclosed herein is a scanning probe microscope including a cantilever, a three-dimensional moving mechanism moving a sample stage in three dimensions, and a measurement chamber sealed not to be exposed to external air. At least the cantilever, the sample stage, and the three-dimensional moving mechanism are accommodated in the measurement chamber. The measurement chamber is provided with a pair of guide rails used to transport the sample stage. The sample stage has an engagement portion. The three-dimensional moving mechanism is disposed in the vicinity of a predetermined position and between the guide rails. The three-dimensional moving mechanism can be moved to above the guide rails and below the guide rails. When the sample stage is transported to the predetermined position in a horizontal direction, the three-dimensional moving mechanism is lifted up to the bottom surface of the sample stage so that the scanning probe microscope can perform measurement.

16 Claims, 4 Drawing Sheets

SCANNING PROBE MICROSCOPE

CROSS REFERENCE TO RELATED APPLICATION(S)

This application claims the benefit of Japanese Patent Application No. JP2015-111872, filed Jun. 2, 2015, which is hereby incorporated by reference in its entirety into this application.

BACKGROUND OF THE INVENTION

1. Technical Field

The present invention relates to a scanning probe microscope (SPM) that uses a probe to measure surface topography and physical properties of a sample that is sealed not to be exposed to air.

2. Description of the Related Art

A scanning probe microscope is a tool used to measure surface topography and physical properties of a sample with a probe that approaches or is in close contact with the sample. In use of scanning probe microscopes, measurement needs to be performed in an oxygen-free or moisture-free condition, a predetermined atmosphere, or a vacuum state.

To meet such a need, Patent Document 1 discloses a technology in which a scanning probe is arranged in a glove box-shaped chamber filled with a gas that can be substituted, and movement of the probe is measured within an atmosphere of a predetermined ambient gas. In addition, Patent Document 2 discloses a technology in which, when a sample is introduced into an analyzer that performs measurement in a vacuum state, a sample holder is covered by a cover so that the specimen maintained in a vacuum state can be introduced into the analyzer.

In a typical scanning probe microscope, a sample stage with a sample placed thereon is mounted on a three-dimensional moving mechanism, the sample is then moved relative to a cantilever that is disposed to face the sample by the three-dimensional moving mechanism, and measurement is performed in a state in which the sample is aligned with the cantilever or in which a constant distance or force is maintained between the sample and the cantilever. The three-dimensional moving mechanism (also referred to as scanner) consists of piezoelectric elements made of ceramic material. Therefore, when the three-dimensional moving mechanism is overloaded, it is easily broken. For such a reason, the three-dimensional moving mechanism has to be installed with extreme care.

However, the technology disclosed in Patent Document 1 has a risk of overloading being applied to the three-dimensional moving mechanism because it is handled with operator's hands through rubber gloves attached to a glove box.

On the other hand, Patent Document 2 discloses only the technology in which when a sample is introduced into a general analyzer such as a scanning electron microscope (SEM), a sample container used to transfer a sample is first transported to a sample introduction portion along guide rails and then to a gate valve, but does not disclose a method of reducing a load applied to a three-dimensional moving mechanism when the sample is moved to be mounted on the three-dimensional moving mechanism in a scanning probe microscope that is maintained in a vacuum state or in a state of being filled with a predetermined ambient gas.

DOCUMENT OF RELATED ARTS

Patent Document (Patent Document 1) Japanese Patent No. 2612395

(Patent Document 2) Japanese Patent Application Publication No. 2001-153760

SUMMARY OF THE INVENTION

Accordingly, the present invention has been made keeping in mind the above problems occurring in the prior art, and an object of the present invention is to provide a scanning probe microscope that prevents a three-dimensional moving mechanism from being overloaded when a sample stage is moved to a scanning probe microscope disposed in a measurement chamber that is sealed not to be exposed to external air and when the sample stage is then mounted on the three-dimensional moving mechanism.

According to one aspect, there is provided a scanning probe microscope including: a cantilever provided with a probe that approaches or comes in contact with a surface of a sample; a sample stage that supports the sample thereon; a three-dimensional moving mechanism that moves the sample stage in three dimensions; and a measurement chamber having an internal space that is sealed not to be exposed to external air. In the scanning probe microscope, at least the cantilever, the sample stage, and the three-dimensional moving mechanism are accommodated in the measurement chamber, wherein the measurement chamber includes: a introduction hole through which the sample stage is introduced into the measurement chamber; and a pair of guide rails that transport the sample stage introduced from the introduction hole to a predetermined position in the measurement chamber. The sample stage has an engagement portion that is engaged with the guide rails and is installed to travel along the guide rails. The three-dimensional moving mechanism is installed in the vicinity of the predetermined position, is disposed between the pair of guide rails, and is installed to move above the guide rails and down below the guide rails. When the sample stage is transported to the predetermined position, the three-dimensional moving mechanism is lifted up and mounted to a bottom surface of the sample stage from below of the guide rails so that measurement of the sample can be performed.

According to the scanning probe microscope of the present aspect, preparation for measurement of the scanning probe microscope is made by lifting the three-dimensional moving mechanism up so that the three-dimensional moving mechanism is mounted to the bottom surface of the sample stage after the sample stage is transported to a predetermined position. Therefore, it is possible to prevent the sample stage from accidently bumping into the three-dimensional moving mechanism during transportation of the sample stage and to prevent the three-dimensional moving mechanism from being overloaded. In addition, when the sample stage is transported to the predetermined position by the guide rails, since the positional alignment of the sample stage with the three-dimensional moving mechanism is automatically made, it is easy to mount the sample stage on the three-dimensional moving mechanism.

The sample stage may be equipped with a transport engagement portion having a front surface and a back surface distanced from each other in a traveling direction of the sample stage. The measurement chamber may be equipped with a transporting mechanism that moves forward and backward in the traveling direction of the sample stage within the measurement chamber by manipulating from an outside of the measurement chamber and that is inserted between the front surface and the back surface of the transport engagement portion to be loosely engaged with transport engagement portion, thereby being used to transport the sample stage.

According to the scanning probe microscope of the present aspect, since the transporting mechanism is loosely inserted into and engaged with the transport engagement portion of the sample stage, it is easier to engage, in comparison with a screwing connection manner, the transporting mechanism and the transport engagement portion with each other even when the transporting mechanism and the transport engagement portion are slightly misaligned with each other. In addition, in the case of the screwing connection manner, it is difficult to reengage the transporting mechanism with the transport engagement portion during transportation of the sample stage when the transporting mechanism is disengaged from the transport engagement portion of the sample stage. However, according to the present aspect, it is possible to relatively easily and surely reengage the disengaged parts by loosely inserting the transporting mechanism into the transport engagement portion of the sample stage during transportation of the sample stage. In addition, since the transporting mechanism and the transport engagement portion of the sample stage are loosely engaged, there is less likelihood that the transporting mechanism having a rod shape is bent or broken than in the case of the screwing connection even when strong force is applied to the engaged parts during transportation of the sample stage.

The scanning probe microscope may further include a coarse adjustment mechanism that is coupled to a lower end of the three-dimensional moving mechanism and can move in the vertical direction in a greater range than the three-dimensional moving mechanism. Since the three-dimensional moving mechanism is moved in the vertical direction with use of the coarse adjustment mechanism, the three-dimensional moving mechanism can be lifted above the guide rails or lowered below the guide rails.

While conventional three-dimensional moving mechanisms are allowed to move only in a small range in a vertical direction, the three-dimensional moving mechanism of the scanning probe microscope according to the present aspect can move in a larger range than the conventional one because the three-dimensional moving mechanism is lifted or lowered with use of the coarse adjustment mechanism. Therefore, the three-dimensional moving mechanism can be lifted above the guide rails and lowered below the guide rails.

The scanning probe microscope may further include a sample cover that is placed on a top surface of the sample stage to seal and isolate the sample from external air, wherein the measurement chamber may be equipped with a cover attachment-and-detachment mechanism that is manipulated from an outside of the measurement chamber, be installed to move in the vertical direction in the measurement chamber, and be connected, in a bayonet connection manner, to the sample cover to detach the sample cover from the sample stage within the measurement chamber.

According to the scanning probe microscope of the present aspect, due to the bayonet connection, the sample attachment-and-detachment mechanism can be easily detached from the sample cover in a manner of rotating the cover attachment-and-detachment mechanism. Therefore, it is possible to easily and surely attach the cover attachment-and-detachment mechanism to the sample cover within the measurement chamber and it is easy to detach the cover attachment-and-detachment mechanism from the sample cover after the sample cover is detached from the sample stage by pulling the sample cover upward within the measurement chamber.

The measurement chamber may include: a main chamber that accommodates the cantilever, the sample stage, and the three-dimensional moving mechanism; and a sample introduction chamber that has the introduction hole, has a smaller volume than the main chamber, and is installed to communicate with the main chamber. The guide rails may continuously extend from the main chamber to the sample introduction chamber.

According to the scanning probe microscope of the present aspect, since the sample introduction chamber is installed independently of the main chamber, when the sample stage is inserted into the measurement chamber, the main chamber does not need to have a large volume. That is, it is possible to reduce not only the volume of the main chamber but also the total volume of the measurement chamber including the main chamber and the sample introduction chamber.

In addition, if a gate valve is installed between the sample introduction chamber and the main chamber for the purpose of sealing both the main chamber and the sample introduction chamber, the guide rails that extend from the main chamber to the sample introduction chamber have to be disconnected due to the gate valve. In this case, extreme care and caution have to be taken to prevent the sample stage from being derailed during transportation of the sample stage. However, according to the present aspect, since the sample introduction chamber and the main chamber are installed to communicate with each other, the guide rails can continuously extend, without a disconnection, from the main chamber to the sample introduction chamber. Therefore, an operation of transporting the sample stage becomes easy.

According to the present invention, it is possible to prevent a three-dimensional moving mechanism from being overloaded when a sample stage is moved to a scanning probe microscope disposed in a measurement chamber that is sealed not to be exposed to external air and when the sample stage is then mounted on the three-dimensional mechanism.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described with reference to the accompanying drawings.

In addition, in the following description, the term "back-to-front" direction means a scanning direction F in which a sample stage 10 runs along guide rails 110, the term "front side" means a side that is relatively near a three-dimensional moving mechanism 11 in a measurement chamber 100, and the term "back side" means a side that is relatively far from the three-dimensional moving mechanism 11. In addition, the term "front surface" means a surface that faces the three-dimensional moving mechanism 11.

Figure 1A:
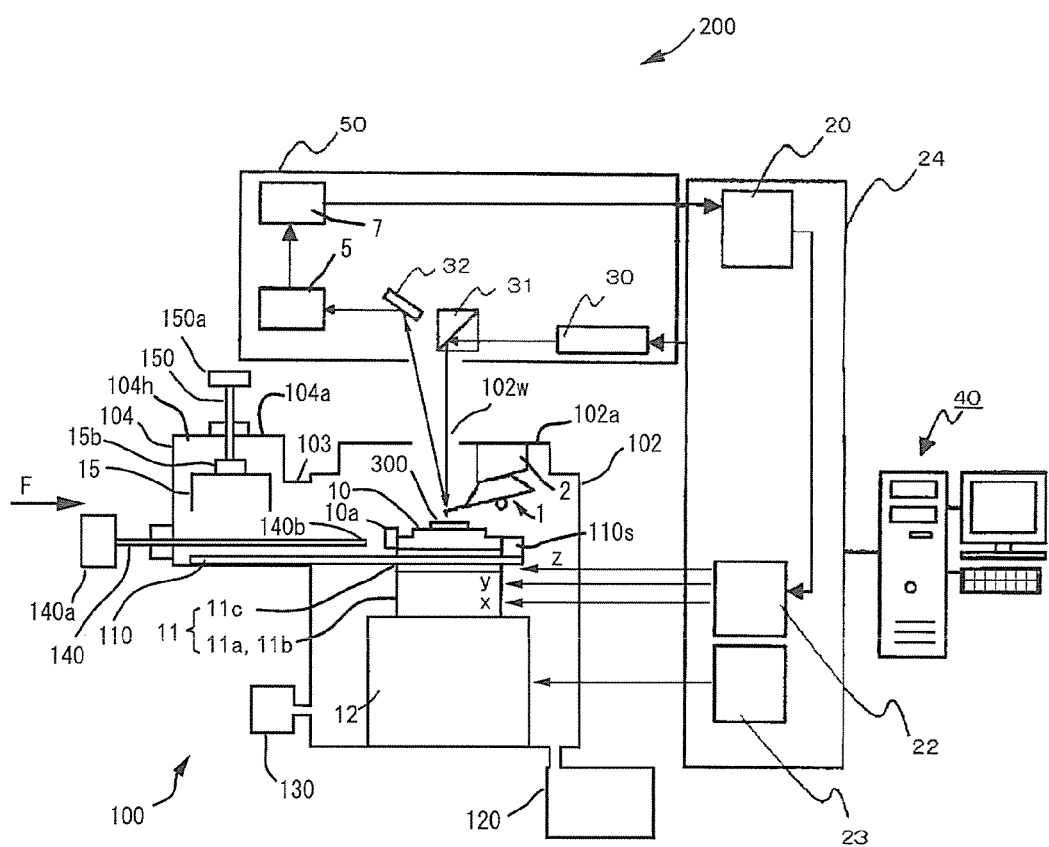
FIG. 1A is a block diagram illustrating a scanning probe microscope according to one embodiment of the present invention.
Figure 1B:
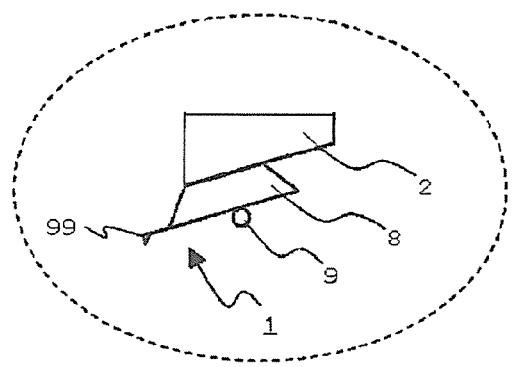
FIG. 1B is an enlarged view illustrating a cantilever of the scanning probe microscope of FIG. 1A.

FIG. 1A is a block diagram illustrating a scanning probe microscope 200 according to one embodiment of the present invention. FIG. 1B is a partially enlarged view illustrating the vicinity of a cantilever 1 of the scanning probe microscope 200.

With reference to FIG. 1A, the scanning probe microscope 200 includes the cantilever 1 with a probe 99 at an end, a sample stage 10 that supports a sample 300 placed thereon, a three-dimensional moving mechanism (hereinafter, also referred to as scanner) 11, a coarse adjustment mechanism 12, a displacement detector 50 that detects a signal indicating a displacement of the cantilever 1, a measurement chamber 100 having an internal space isolated from external air, and a control means including a probe microscope controller 24 and a computer 40.

The measurement chamber 100 is connected to a vacuum pump 120 and an ambient gas introduction portion 130. The inside of the measurement chamber is maintained in a vacuum state, at a reduced pressure, or in a predetermined ambient gas. The measurement chamber 100 includes a main chamber 102 and a sample introduction chamber 104 that communicates with the main chamber 102 and has as a smaller internal volume than the main chamber 102. The main chamber 102 and the sample introduction chamber 104 communicate with each other through a neck portion 103 having a smaller diameter than the main chamber 102 and the sample introduction chamber 104.

According to the present embodiment, the cantilever 1 (including an inclined surface block 2), the sample stage 10, the three-dimensional moving mechanism 11, and the coarse adjustment mechanism 12 are accommodated in the main chamber 102. However, alternatively, the cantilever 1 (including the inclined surface block 2), the sample stage 10, and the three-dimensional moving mechanism 11 may be accommodated in the measurement chamber 100. Since fewer elements of the scanning probe microscope 200 are disposed inside the measurement chamber 100, it is possible to reduce the internal volume of the measurement chamber 100, which enables the inside of the measurement chamber 100 can be stably maintained in a vacuum state or in a state of being filled with a predetermined ambient gas.

An upper cover 102a of the main chamber 102 is provided with a window 102w made of glass and the cantilever 1 attached to the inside surface of the upper cover 102a is arranged to face the window 102w. In addition, a laser beam is irradiated to the back surface of the cantilever 1 through the window 102w from the displacement detector 50 installed above the main chamber 102.

The computer 40 includes a control board for controlling operation of the scanning probe microscope 200, a central processing unit (CPU), a read only memory (ROM), a random access memory (RAM), a storage unit such as a hard disk drive (HDD), an interface unit, and an operation unit.

The scanning probe microscope 200 is of a sample scanning type in which an end of the cantilever 1 is fixed, the cantilever 1 is arranged above the sample stage 10, and a sample is moved for scanning. On the other hand, a scanning probe microscope of a lever scanning type in which a sample is fixed and a cantilever is moved for scanning has a larger size than a scanning probe microscope of a sample scanning type and thus is equipped with a measurement chamber whose internal volume is larger than that of a measurement chamber of a scanning probe microscope of the sample scanning type. Therefore, the sample scanning type is preferred.

The probe microscope controller 24 includes a Z-control circuit 20 described below, X, Y, and Z output amplifiers 22, and a coarse adjustment control circuit 23. The probe microscope controller 24 is connected to the computer 40 to enable high speed data communication. The computer 40 controls operation conditions of circuits in the probe microscope controller 24, receives and controls measurement data, and provides information of surface topology, surface physical properties, and force curves that are obtained with use of the cantilever 1.

The coarse adjustment mechanism 12 coarsely moves the three-dimensional moving mechanism 11 and the sample stage 10 disposed above the three-dimensional moving mechanism 11 in a vertical direction, and operates under control of the coarse adjustment control circuit 23. In typical microscopes, the three-dimensional moving mechanism 11 is installed to move in a small range in both a vertical direction and a horizontal direction. However, according to the present embodiment, since the three-dimensional moving mechanism 11 is lifted and lowered by using the coarse adjustment mechanism 12, the three-dimensional moving mechanism 11 can be moved, in a greater range, above and below the gu ide rails 110.

The up-and-down movement of the coarse adjustment mechanism 12 is performed by using a stepping motor and a transport bolt, but is not limited thereto.

The three-dimensional moving mechanism 11 is a mechanism to finely move the sample stage 10 and the sample 300 in three dimensions. The three-dimensional moving mechanism 11 has a cylindrical housing in which two (bi-axial) piezoelectric elements 11a and 11b and a piezoelectric element 11c are accommodated in the housing. The piezoelectric elements 11a and 11b cause the sample stage 10 to scan a xy plane (i.e. the surface of the sample 300) and a piezoelectric 11c that causes the sample stage 10 to scan in a Z (height) direction. The piezoelectric elements operate such that their crystals are deformed when an electric field is applied thereto and produce an electric charge when the crystals are forcibly deformed by an external force. The piezoelectric element may be made of lead zirconate titanate (PZT), which is a ceramic material. On the other hand, the shape and operation of the three-dimensional moving mechanism 11 are not limited to the ones described above. Additionally, an XY moving mechanism that can move in a greater range in X and Y directions than the three-dimensional moving mechanism 11 may be installed between the coarse adjustment mechanism 12 and the three-dimensional moving mechanism 11, for the purpose of coarse adjustment of the sample stage in the X and Y directions. Thanks to these elements, it is possible to perform coarse positional alignment at a measurement position in case when the sample stage 10 carries a large sample.

The piezoelectric elements 11a, 11b, and 11c are connected to the X, Y, and Z output amplifiers 22, so predetermined control signals (voltages) are output from the X, Y, and Z output amplifiers 22, which drives the piezoelectric elements 11a and 11b in the X and Y directions and the piezoelectric element 11c in the Z direction. The signal output to the piezoelectric element 11c is detected by the probe microscope controller 24 and recorded as measurement data.

The cantilever 1 has a cantilever spring structure and is disposed to be near a side surface of the tip 8 of the cantilever 1. The tip 8 is pressed against the inclined surface block 2 by a tip pushing portion 9.

A laser beam emitted from a laser light source 30 is incident onto a dichroic mirror 31 and is then irradiated onto the back surface of the cantilever 1. The laser beam reflected from the cantilever 1 is reflected again from a mirror 32 and is then detected by the displacement detector 5. The displacement detector 5 is a quadrant optical detector, for example. The amount of displacement of the cantilever 1 in the Z direction is detected as a change in optical path (incident position) of the laser beam reflected from the cantilever 1, by the displacement detector 5.

The amplitude of the electric signal of the displacement detector 5 is amplified by a preamplifier 7 and the amplified electrical signal is input to the Z control circuit 20. The Z control circuit 20 transmits a control signal to a Z signal unit of the Z output amplifier 22 so that the distance or force between the probe 99 and the sample 300 can reach the target distance or force, and the Z signal unit outputs a control signal (voltage) that drives the piezoelectric element 11c in the Z direction. That is, the displacement of the cantilever 1 caused by the interatomic force between the sample 300 and the probe 99 is detected in the way described above. Then, the Z control circuit 20 displaces the three-dimensional moving mechanism 11 c and controls the distance or force between the probe 99 and the sample 300. In this state, the three-dimensional moving mechanism 11 is displaced in the X and Y directions by the X, Y, and Z output amplifiers 22, thereby scanning the sample 300 and mapping surface topology or physical properties with the amount of displacement.

In addition, the laser light source 30, the dichroic mirror 31, the mirror 32, the displacement detector 5, and the preamplifier 7 collectively make up the displacement detector 50.

Three-dimensional topology is recorded in the computer 40 from the displacement in height of the sample stage 10 against the displacement in the XY plane of the sample stage 10. After that, the recorded data is subject to analysis or predetermined processing. In this way, the probe microscope operates. When dynamic force microscope (DFM) measurement mode is performed in which the inclined surface block 2 is connected to a vibrator (not illustrated) to vibrate the cantilever, a topological phase can be obtained from the value of topology in a resonant condition, an error signal phase can be obtained from a difference between an actual amplitude of vibration and a target amplitude, and a multi-functional measurement phase can be obtained from the values of physical properties of the probe and the sample.

Figure 2:
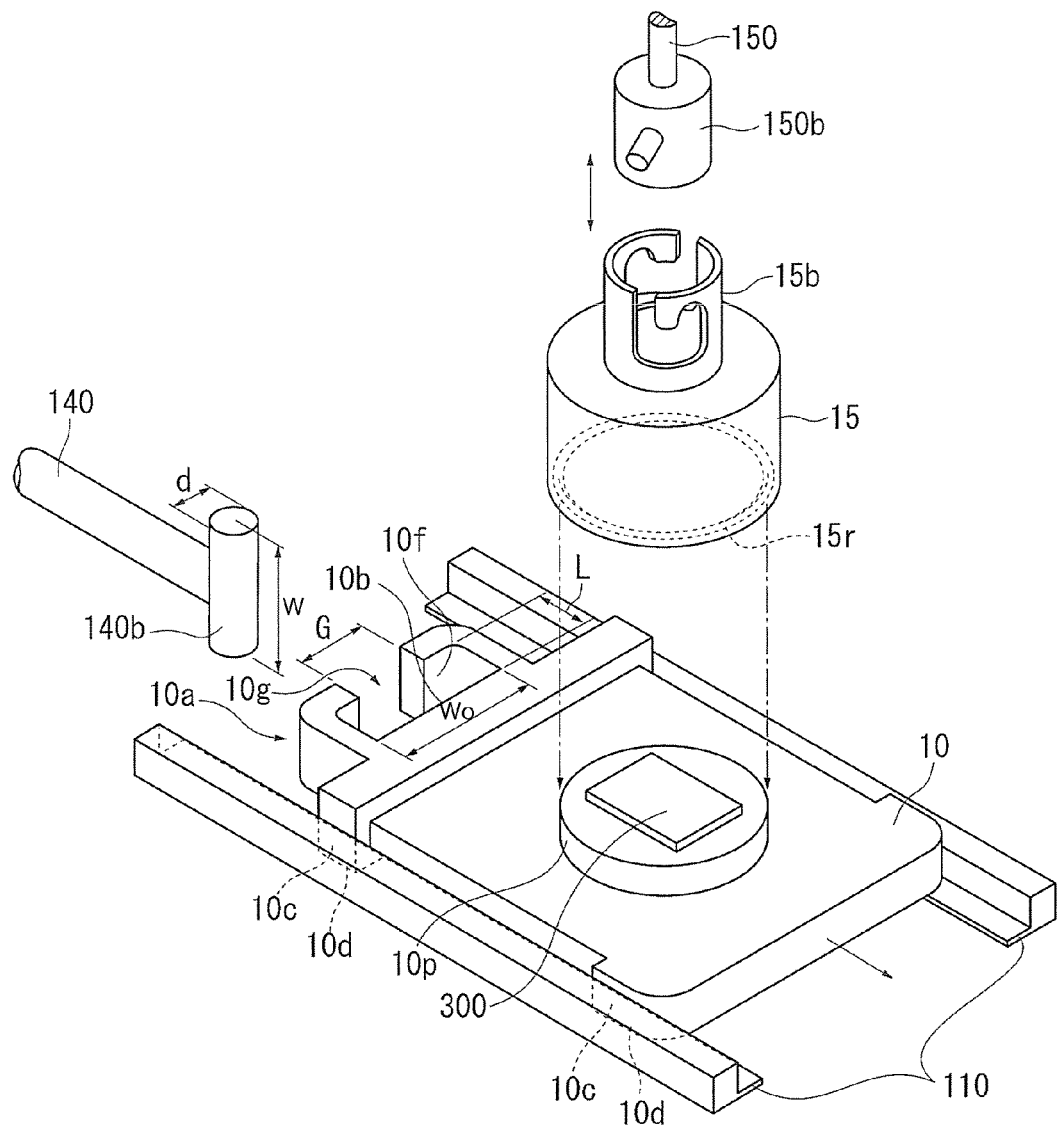
FIG. 2 is a perspective view illustrating a sample stage.
Figure 3:
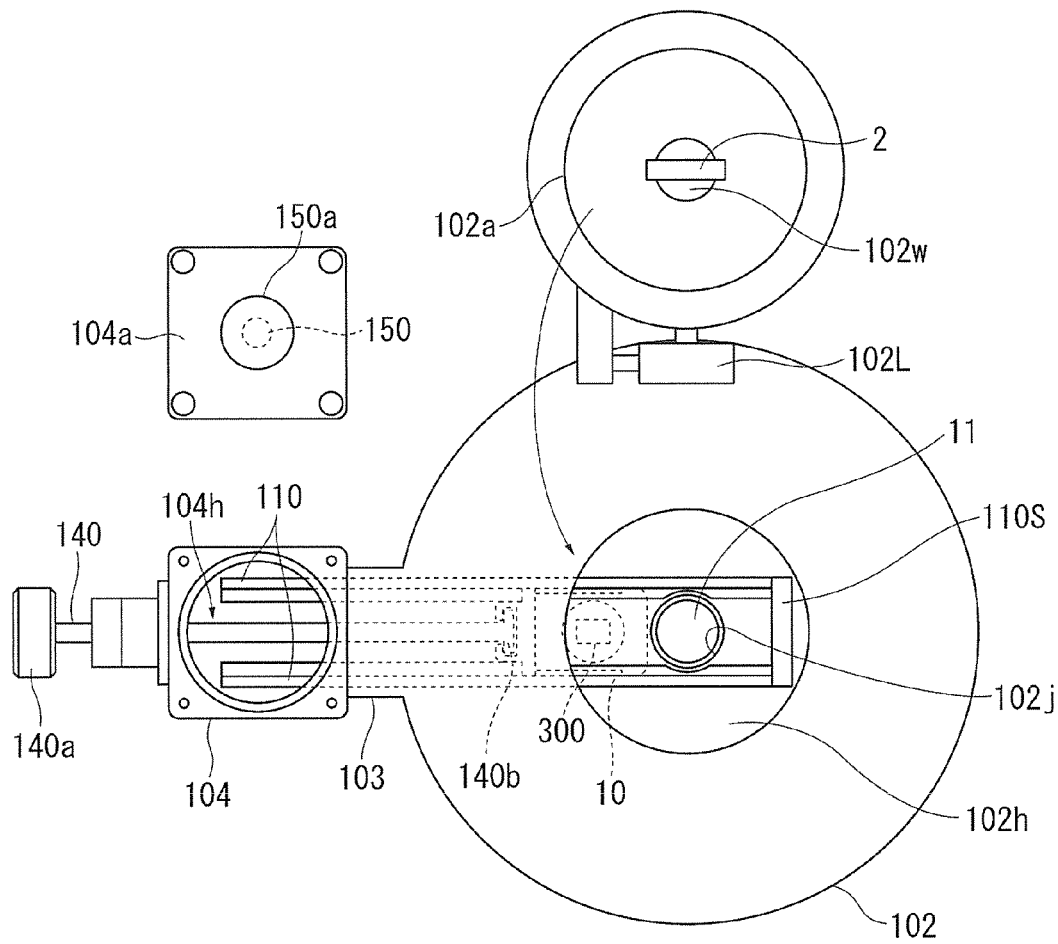
FIG. 3 is a top view illustrating a measurement chamber.

Next, features of the present invention, i.e., the sample stage 10 and the measurement chamber 100, will be described with reference to FIGS. 1A, 1B, 2, and 3. FIG. 2 is a perspective view of the sample stage 10 and FIG. 3 is a top view of the measurement chamber 100.

As illustrated in FIG. 2, the sample stage 10 has a rectangular plate shape with rounded corners at the front side and is supported by being inserted between a pair of guide rails 110 each having an L-shaped cross section. The side surfaces 10c and the bottom surface 10d of the sample stage 10 are engaged with or are in contact with the guide rails 110, so the sample stage 10 can slide along the guide rails 110. The L-shaped corners of the respective guide rails 110 faces outside.

The side surfaces 10c and the bottom surface 10d correspond to the term "engagement portion" described in claims.

A center portion 10p of the sample stage 10 protrudes from the top surface and the protruding portion has a cylinder shape. The sample 300 is placed on the top surface of the center portion 10p. A sample cover 15 having a top end-closed cylinder shape is put on the sample stage 10 to encompass the center portion 10p. In this way, the sample 300 is sealed and isolated from external air. A recessed portion is formed in an inside surface of the sample cover 15, and a sealing member (O ring) 15r is installed in the recessed portion. The sealing member 15r functions to hermetically seal the inside of the sample cover, especially preventing a gap between the inside surface of the sample cover 15 and the center portion 10p of the sample stage 10.

A center portion of the top surface of the sample cover 15 is provided with a bayonet connector (BNC) 15b that can be coupled, in a bayonet connection manner, to a male connector 150b installed at a leading end of a cover detachment rod (cover detachment tool) 150 described below. The bayonet connection is a connection made such that one member has a claw (protruding portion), the counterpart member has a recess or groove, the claw is inserted into the recess or groove, and then the members are rotated for connection. Alternatively, both members to be coupled to each other may be provided with respective claws (protruding portions).

In addition, a rear end (left side of FIG. 2) of the sample stage 10 is provided with a transport engagement portion 10a having a C shape in a plan view. Since the size G of a cutout 10g of the C-shaped transport engagement portion 10a is larger than the diameter d of a hook 140b, it is possible to insert the hook 140b through the cutout 10g by rotating a transport rod 140 in an axial direction so that the longitudinal direction of the hook 140b agrees with the vertical direction. The longitudinal length W of the hook 140b is larger than the size G of the cutout 10g of the transport engagement portion 10a and is smaller than the length $W_0$ of a long wall portion inside the transport engagement portion 10a, which is disposed to face the cutout 10g. Therefore, when the hook 140b is inserted into the transport engagement portion 10a through the cutout 10g, and then rotated to the axial direction by 90 degrees, the hook 140 cannot be disengaged from the transport engagement portion 10a. That is, the hook 140b is securely engaged with the transport engagement portion 10a.

In the transport engagement portion 10a, since a distance L between a front inside surface 10f and a rear inside surface 10b thereof is larger than the diameter d of the hook 140b, the hook 140b can be loosely inserted between the front inside surface 10f and the rear inside surface 10b. For this reason, the transport rod 140 and the transport engagement portion 10a can be easily engaged in comparison with a screwing connection manner although there is a slight misalignment in positioning. In addition, in the case of the screwing connection manner, it is difficult to reengage the transport rod 140 and the transport engagement portion 10a when a screw is unscrewed out during transportation of the sample stage 10 by the transport rod 140. However, in the case of the bayonet connection according to the present invention, it is possible to easily reengage the transport rod 140 and the transport engagement portion 10a with each other during transportation thereof because the reengagement involves a simple operation of loosely and easily inserting the hook 140 into a space of the transport engagement portion 10a. For this reason, even a strong load is applied to the engaged structure during transportation, there is a less risk that the transport rod 140 is bent or broken than that in the case of the screwing connection manner between the transport rod 140 and the transport engagement portion 10a.

Next, the structure of the measurement chamber 100 will be described below.

The measurement chamber 100 includes the main chamber 102 and the sample introduction chamber 104 that has a smaller internal volume than the main chamber 102, is disposed outside the main chamber 102, and is connected to the main chamber 102 through the neck portion 103. The guide rails 110 are installed on the bottom surfaces of the main chamber 102 and the sample introduction chamber 104 and the guide rails continuously extend from the sample introduction chamber 104 to the main chamber 102.

If a gate valve is installed between the main chamber 102 and the sample introduction chamber 104, the guide rails 110 cannot continuously extend from the main chamber 102 to the sample introduction chamber 104 due to the gate valve. In this case, therefore, when transporting the sample, caution is necessary to prevent the sample stage 10 from derailing. However, according to the present embodiment, since the main chamber 102 and the sample introduction chamber 104 are installed to communicate with each other, there is no disconnection of the guide rails 110 in the way between the main chamber 102 and the sample introduction chamber 104. Therefore, it becomes easy to transport the sample stage from the sample introduction chamber 104 to the main chamber 102.

In addition, since the measurement chamber is made up of the main chamber 102 and the sample introduction chamber 104 that are separated from each other, the main chamber 12 itself is not need to be enlarged to insert the sample stage 10 into the measurement chamber 100. Thus, the size of the main chamber 102 can be reduced. That is, the total volume of the measurement chamber 100 including the main chamber 102 and the sample introduction chamber 104 is reduced in comparison with a conventional measurement chamber.

The main chamber 102 has a cylinder shape and has a circular central opening 102h at the top. The central opening 102h of the main chamber 102 is closed by the upper cover 102a. The upper cover 102a is provided with the glass window 102w. In addition, the inclined surface block 2 is attached to the inside surface of the upper cover 102a and the cantilever 1 is attached to the inclined surface block 2. The upper cover 102a is attached, in a hinged manner, to the upper surface of the main chamber 102 so that the upper cover 102 is openable.

The guide rails 110 extend up to a position of the central opening 102h of the upper cover 102a and a front end (right side of FIG. 3) of the guide rails 110 is provided with a stopper 110s that restricts movement of the sample stage 10. In addition, a moving mechanism introduction hole 102j is formed in the center of the central opening 102h, in a position between the guide rails 110. Through the moving mechanism introduction hole 102h, the three-dimensional moving mechanism 11 can be moved up above the guide rails 110 and down below the guide rails 110 (protruding-receding) between the pair of guide rails 110.

The sample introduction chamber 104 has a box shape and has a circular opening 104h in the top surface thereof. The circular opening 104h (also referred to as sample introduction hole) is covered by an upper cover 104a. The cover detachment rod 150 extending in the vertical direction, described above, is attached to the upper cover 104a. The upper cover 104 is attached, in a screwing manner, to the top surface of the sample introduction chamber 104, so the upper cover 104 can be detached by unscrewing a screw.

A transport rod (transport mechanism) 140 is attached to the rear end of the sample introduction chamber 104 such that the transport rod 140 passes in the back-to-front direction. The transport rod 140 will be described later herein.

Although not illustrated, two side surfaces of the sample introduction chamber 104 in a direction that intersects the guide rails 110 are provided with respective transparent windows so that the inside of the sample introduction chamber 104 is visible from the outside of the measurement chamber.

Next, a method of transporting the sample stage 10 to the measurement chamber 100 is described.

First, the sample cover 15 is placed on the top surface of the sample stage 10 to isolate the sample 300 from external air, so the sample 300 is sealed. Next, the upper cover 104a of the sample introduction chamber 104 is detached. Next, the sample stage 10 is inserted into the sample introduction chamber 104 through the sample introduction hole 104h in the top surface of the sample introduction chamber 104. The sample stage 10 is then placed to be inserted and supported between the pair of guide rails 110. At this point, the transport rod 140 is retracted to be back side of the sample introduction hole 104h not to interfere with the sample stage 10.

Next, the sample introduction hole 104h is covered by the upper cover 104a. Next, the inside of the measurement chamber 100 is purged using a vacuum pump 120, and a predetermined gas is introduced into the measurement chamber 100 from the ambient gas introduction portion 130 as necessary. Next, the cover detachment rod 150 is manipulated from the outside of the measurement chamber 100 using a handle 150a at an upper end of the cover detachment rod 150. The cover detachment rod 150 is moved down toward the bottom of the sample introduction chamber 104 and the mail connector 150b at the leading end of the cover detachment rod 150 is bayonet-connected to the bayonet connector 15b of the sample cover 15. At this point, since the internal pressure of the measurement chamber 100 is adjusted to be equal to the internal pressure of the sample cover 15, it is possible to easily detach the sample cover 15 from the sample stage 10 by pulling upward the cover detachment rod 150.

Next, the transport rod 140 is manipulated from the outside of the measurement chamber 100 using the handle 140a at the rear end of the transport rod 140, so the transport rod 140 is moved toward the front side of the measurement chamber 100 and the hook 140b of the transport rod 140 is loosely engaged with the transport engagement portion 10a. In addition, as the transport rod 140 is moved toward the front side of the measurement chamber 100, the sample stage 10 travels forward along the guide rails 110 and then stops at the stopper 110s. At this point, the sample stage 10 is located directly above the three-dimensional moving mechanism 11, however the three-dimensional moving mechanism 11 is contracted to be disposed under the guide rails 110, not to interfere with traveling of the sample stage 10.

In this state, the coarse adjustment mechanism 12 is lifted so that the three-dimensional moving mechanism 11 disposed on the coarse adjustment mechanism 12 can be lifted. Through this operation, the three-dimensional moving mechanism 11 is arranged to support the bottom surface of the sample stage 10. Next, when the three-dimensional moving mechanism 11 lifts the sample stage 10 off from the rails, the scanning probe microscope 200 can perform measurement of the sample.

In this way, since the sample stage 10 is laterally transported to a predetermined position and then the three-dimensional moving mechanism 11 lifted using the coarse adjustment mechanism 12 comes to support the sample stage 10, it is possible to prevent the sample stage 10 from accidently coming into contact with the three-dimensional moving mechanism 11 and to prevent the three-dimensional moving mechanism from being overloaded. In addition, when the sample stage 10 is laterally moved to a predetermined position on the guide rails 110, the sample stage 10 is automatically aligned with the three-dimensional moving mechanism 11. Therefore, it is easy to mount the sample stage 10 on the three-dimensional moving mechanism 11.

A discharging operation of the sample stage 10 is performed in the reverse process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scanning probe microscope comprising:
a cantilever provided with a probe that approaches or comes in contact with a surface of a sample;
a sample stage that supports the sample thereon;
a three-dimensional moving mechanism that three-dimensionally moves the sample stage; and
a measurement chamber having an internal space that is sealed not to be exposed to external air,
wherein at least the cantilever, the sample stage, and the three-dimensional moving mechanism are accommodated in the measurement chamber,
wherein the measurement chamber includes: an introduction hole through which the sample stage is introduced into the measurement chamber; and a pair of guide rails that transport the sample stage introduced through the introduction hole to a predetermined position in the measurement chamber,
wherein the sample stage is provided with an engagement portion that is engaged with the guide rails and is installed to travel along the guide rails,
wherein the three-dimensional moving mechanism is installed in the vicinity of the predetermined position, is installed to move up above the guide rails and down below the guide rails between the pair of guide rails, and
wherein when the sample stage is transported to the predetermined position, the three-dimensional moving mechanism is lifted from below the guide rails and mounted to a bottom surface of the sample stage so that measurement of the sample is performed.

2. The scanning probe microscope according to claim 1, wherein the sample stage is equipped with a transport engagement portion having a front surface and a back surface distanced from each other in a traveling direction of the sample stage, and
wherein the measurement chamber is equipped with a transporting mechanism that moves forward and backward in the traveling direction of the sample stage within the measurement chamber by being manipulated from an outside of the measurement chamber, and that is loosely inserted and engaged with the transport engagement portion between the front surface and the back surface of the transport engagement portion, to transport the sample stage.

3. The scanning probe microscope according to claim 1, further comprising a coarse adjustment mechanism that is coupled to a lower part of the three-dimensional moving mechanism and moves in the vertical direction in a greater range than the three-dimensional moving mechanism,
wherein the three-dimensional moving mechanism is moved in the vertical direction with use of the vertical movement of the coarse adjustment mechanism to be lifted above the guide rails or to be lowered below the guide rails.

4. The scanning probe microscope according to claim 2, further comprising a coarse adjustment mechanism that is coupled to a lower part of the three-dimensional moving mechanism and moves in the vertical direction in a greater range than the three-dimensional moving mechanism,
wherein the three-dimensional moving mechanism is moved in the vertical direction with use of the vertical movement of the coarse adjustment mechanism to be lifted above the guide rails or to be lowered below the guide rails.

5. The scanning probe microscope according to claim 1, further comprising a sample cover that is placed on a top surface of the sample stage to seal and isolate the sample from external air,
wherein the measurement chamber is equipped with a cover attachment-and-detachment mechanism that is manipulated from an outside of the measurement chamber, is installed to move in the vertical direction in the measurement chamber, and is connected in a bayonet connection manner to the sample cover to detach the sample cover from the sample stage in the measurement chamber.

6. The scanning probe microscope according to claim 2, further comprising a sample cover that is placed on a top surface of the sample stage to seal and isolate the sample from external air,
wherein the measurement chamber is equipped with a cover attachment-and-detachment mechanism that is manipulated from an outside of the measurement chamber, is installed to move in the vertical direction in the measurement chamber, and is connected in a bayonet connection manner to the sample cover to detach the sample cover from the sample stage in the measurement chamber.

7. The scanning probe microscope according to claim 3, further comprising a sample cover that is placed on a top surface of the sample stage to seal and isolate the sample from external air,
wherein the measurement chamber is equipped with a cover attachment-and-detachment mechanism that is manipulated from an outside of the measurement chamber, is installed to move in the vertical direction in the measurement chamber, and is connected in a bayonet connection manner to the sample cover to detach the sample cover from the sample stage in the measurement chamber.

8. The scanning probe microscope according to claim 4, further comprising a sample cover that is placed on a top surface of the sample stage to seal and isolate the sample from external air,
wherein the measurement chamber is equipped with a cover attachment-and-detachment mechanism that is manipulated from an outside of the measurement chamber, is installed to move in the vertical direction in the measurement chamber, and is connected in a bayonet connection manner to the sample cover to detach the sample cover from the sample stage in the measurement chamber.

9. The scanning probe microscope according to claim 1, wherein the measurement chamber includes: a main chamber that accommodates the cantilever, the sample stage, and the three-dimensional moving mechanism; and a sample introduction chamber having the introduction hole, has a smaller internal volume than the main chamber, and is installed to communicate with the main chamber, and wherein the guide rails continuously extend from the sample introduction chamber to the main chamber.

10. The scanning probe microscope according to claims 2, wherein the measurement chamber includes: a main chamber that accommodates the cantilever, the sample stage, and the three-dimensional moving mechanism; and a sample introduction chamber having the introduction hole, has a smaller internal volume than the main chamber, and is installed to communicate with the main chamber, and wherein the guide rails continuously extend from the sample introduction chamber to the main chamber.

11. The scanning probe microscope according to claim 3, wherein the measurement chamber includes: a main chamber that accommodates the cantilever, the sample stage, and the three-dimensional moving mechanism; and a sample introduction chamber having the introduction hole, has a smaller internal volume than the main chamber, and is installed to communicate with the main chamber, and wherein the guide rails continuously extend from the sample introduction chamber to the main chamber.

12. The scanning probe microscope according to claim 4, wherein the measurement chamber includes: a main chamber that accommodates the cantilever, the sample stage, and the three-dimensional moving mechanism; and a sample introduction chamber having the introduction hole, has a smaller internal volume than the main chamber, and is installed to communicate with the main chamber, and wherein the guide rails continuously extend from the sample introduction chamber to the main chamber.

13. The scanning probe microscope according to claim 5, wherein the measurement chamber includes: a main chamber that accommodates the cantilever, the sample stage, and the three-dimensional moving mechanism; and a sample introduction chamber having the introduction hole, has a smaller internal volume than the main chamber, and is installed to communicate with the main chamber, and wherein the guide rails continuously extend from the sample introduction chamber to the main chamber.

14. The scanning probe microscope according to claim 6, wherein the measurement chamber includes: a main chamber that accommodates the cantilever, the sample stage, and the three-dimensional moving mechanism; and a sample introduction chamber having the introduction hole, has a smaller internal volume than the main chamber, and is installed to communicate with the main chamber, and wherein the guide rails continuously extend from the sample introduction chamber to the main chamber.

15. The scanning probe microscope according to claim 7, wherein the measurement chamber includes: a main chamber that accommodates the cantilever, the sample stage, and the three-dimensional moving mechanism; and a sample introduction chamber having the introduction hole, has a smaller internal volume than the main chamber, and is installed to communicate with the main chamber, and wherein the guide rails continuously extend from the sample introduction chamber to the main chamber.

16. The scanning probe microscope according to claim 8, wherein the measurement chamber includes: a main chamber that accommodates the cantilever, the sample stage, and the three-dimensional moving mechanism; and a sample introduction chamber having the introduction hole, has a smaller internal volume than the main chamber, and is installed to communicate with the main chamber, and wherein the guide rails continuously extend from the sample introduction chamber to the main chamber.

\* \* \* \* \*